US010048972B2

(12) United States Patent
Heinlein et al.

(10) Patent No.: US 10,048,972 B2
(45) Date of Patent: Aug. 14, 2018

(54) METHOD FOR MODEL-BASED GENERATION OF STARTUP CONFIGURATIONS OF EMBEDDED SYSTEMS

(71) Applicants: Marc Heinlein, Rodgau (DE); Joachim Schott, Wettenberg (DE)

(72) Inventors: Marc Heinlein, Rodgau (DE); Joachim Schott, Wettenberg (DE)

(73) Assignee: Continental Automotive GmbH, Hannover (DE)

( * ) Notice: Subject to any disclaimer, the term of this patent is extended or adjusted under 35 U.S.C. 154(b) by 8 days.

(21) Appl. No.: 14/741,205

(22) Filed: Jun. 16, 2015

(65) Prior Publication Data

US 2015/0363213 A1    Dec. 17, 2015

(30) Foreign Application Priority Data

Jun. 17, 2014    (DE) .................. 10 2014 211 616

(51) Int. Cl.
| G06F 9/445 | (2018.01) |
| G06F 9/44 | (2018.01) |
| G06F 8/34 | (2018.01) |
| G06F 8/35 | (2018.01) |

(52) U.S. Cl.
CPC ............ G06F 9/44505 (2013.01); G06F 8/34 (2013.01); G06F 8/35 (2013.01)

(58) Field of Classification Search
None
See application file for complete search history.

(56) References Cited

U.S. PATENT DOCUMENTS

| 2003/0135842 A1* | 7/2003 | Frey .................... G06F 8/71 717/121 |
| 2004/0172592 A1 | 9/2004 | Collie et al. |
| 2006/0101424 A1 | 5/2006 | Griffith et al. |
| 2007/0220228 A1* | 9/2007 | Huang ............... G11C 7/1045 711/170 |
| 2008/0098350 A1 | 4/2008 | Bailleul et al. |
| 2010/0138808 A1* | 6/2010 | Kim .................... G06F 8/10 717/104 |

(Continued)

OTHER PUBLICATIONS

"Modeling of Configurations for Embedded System Implementations in MARTE", Quadri et al., published in "1st workshop on Model Based Engineering for Embedded Systems Design—Design, Automation and Test in Europe (Date 2010) (2010)".*

*Primary Examiner* — Daxin Wu
(74) *Attorney, Agent, or Firm* — Cozen O'Connor

(57) ABSTRACT

A method for model-based generation of startup configurations of embedded systems that includes importing into a modeling module a first startup configuration in textual representation by a system synchronization module, generating a graphical representation of the startup configuration by the modeling module, and modifying the graphical representation of the first startup configuration generating from the modified graphical representation a second, modified startup configuration in textual representation by the modeling module, and exporting the second modified startup configuration into the system synchronization module, which can simplify generation of startup configurations of an embedded system.

7 Claims, 2 Drawing Sheets

(56) References Cited

U.S. PATENT DOCUMENTS

| | | | |
|---|---|---|---|
| 2012/0011097 A1* | 1/2012 | Matsumura | G06F 17/30569 707/606 |
| 2013/0054220 A1* | 2/2013 | Gupta | G06F 11/3006 703/22 |
| 2013/0080993 A1* | 3/2013 | Stravers et al. | G06F 8/35 717/104 |
| 2013/0253672 A1* | 9/2013 | Eschmann | G05B 15/02 700/83 |
| 2015/0370879 A1* | 12/2015 | Grignon | G06F 17/30589 707/736 |

\* cited by examiner

METHOD FOR MODEL-BASED GENERATION OF STARTUP CONFIGURATIONS OF EMBEDDED SYSTEMS

BACKGROUND OF THE INVENTION

Field of the Invention

The present invention relates to a method for model-based generation of startup configurations of embedded systems, a program element, and a machine-readable medium.

Description of the Related Art

Embedded systems are computer systems embedded in devices, equipment, and machines that execute specific applications such as monitoring and open-loop and closed-loop control functions. A vehicle contains examples of such systems, in engine management, for collision monitoring, airbag control, in power windows, and central locking systems. In these systems, a multiplicity of software components handle, for example, the control of the system itself and/or the interaction of the system with other systems. Since the startup configuration of an embedded system may comprise a multiplicity of configuration parts per software component, editing the startup configuration can be error-prone and time-consuming. The same applies to checking the startup sequence of the embedded system at startup.

SUMMARY OF THE INVENTION

An object of one embodiment of the present invention is simplifying generation of startup configurations of an embedded system.

One embodiment of the invention relates to a method for model-based generation of startup configurations of embedded systems. The method comprises the step of importing into a modeling module a first startup configuration in textual representation by a system synchronization module.

An embedded system is understood to mean a particular type of the small computers that are installed in certain products, in other words are embedded. Usually they perform control, monitoring or operating functions in these products. The word "embedded" also points to the fact that these systems are often part of a much larger architecture. It is certainly quite common in practice that a plurality of entirely different embedded systems are used in parallel in one system. The embedded system can be implemented by highly specialized operating systems such as QNX, VXWORKS, or ECOS. In addition, special embedded versions of standard operating systems such as LINUX, NET-BSD, or WINDOWS are now proving popular.

The startup configuration of an embedded system can comprise one configuration part per software component. Certain settings or commands of a software component are defined in each configuration part. For instance, the startup sequence of software components is defined in the startup configuration. There are numerous file formats in which startup configurations are saved. In principle, the file format used does not depend on the operating system, although often applications use the same formats as the operating system on which they are running. For instance under LINUX, a very large number of different formats are used, which involve text files such as ASCII. An example of such a file is an XML (Extensible Markup Language) file, which is a markup language for representing hierarchically structured data in the form of text files.

The startup configuration of an embedded system can comprise one configuration part per software component. Certain settings or commands of a software component are defined in each configuration part. For instance, the startup sequence of software components is defined in the startup configuration. There are numerous file formats in which startup configurations are saved. In principle, the file format used does not depend on the operating system, although often applications use the same formats as the operating system on which they are running. For instance under Linux, a very large number of different formats are used, which involve text files such as ASCII. An example of such a file is an XML (Extensible Markup Language) file, which is a markup language for representing hierarchically structured data in the form of text files.

The system synchronization module is used for synchronizing data between the startup configuration and the other files. The data is interchanged in this process, with the result that the startup configuration contains the updated data. In other words, the settings or commands of software components are updated. An example of this is updating the startup sequence of software components.

According to one embodiment of the invention, the method comprises generating a graphical representation of the startup configuration by the modeling module.

The modeling module is designed such that it represents the settings or commands of the software components of the embedded system, which settings or commands are defined in the startup configuration. The modeling module can be implemented by a modeling program, in particular by a graphical modeling program. A graphical modeling program is a software program that is represented and/or programmed using graphical elements. An example of such a program is UML (Unified Modeling Language), which is a graphical modeling language for specifying, designing and documenting software parts and other systems.

The graphical representation shows a graphical view of the settings or commands of the software components of the embedded system, which settings or commands are defined in the startup configuration. For example, the dependencies between the individual configuration parts of software components can be represented graphically. The graphical representation can be achieved, for instance, by elements that describe certain functions or components and by connections that define a connection to the next element.

This makes it possible to review and handle the settings and commands of the software components, which settings and commands are located in the startup configuration. In other words, the graphical representation makes it easier to identify the settings or commands of the software components of an embedded system, which settings or commands are defined in the startup configuration.

According to one embodiment of the invention, the method comprises modifying the graphical representation of the startup configuration. For example, the startup configuration can be modified by editing the graphical elements and the connections thereof in the modeling module. This simplifies interactive checking of the startup configuration.

According to one embodiment of the invention, the method comprises generating from the modified graphical representation a second, modified startup configuration in textual representation by the modeling module.

According to one embodiment of the invention, the method comprises exporting the second, modified startup configuration into the system synchronization module.

The modeling module is also used to generate the modified startup configuration in textual representation. Numerous different text formats can be used depending on operating systems. For example, the graphically represented startup configuration can be generated in an XML-based format. The generated text file, i.e. the textual representation of the startup configuration, is exported into the system synchronization module and edited further.

According to one embodiment of the invention, the graphical representation of the first startup configuration comprises at least one diagram. The diagram is a program flowchart. This chart is a graphical representation for implementing an algorithm in a program, and describes the sequence of operations for solving a problem. For example it is a flow diagram, which depicts the manner of use, the provision and alteration of data within a program. In the case of a modeling module using UML to model the startup configuration, the graphical representation of the startup configuration can be achieved by structural diagrams such as component diagrams or deployment diagrams, for instance, and by sequence diagrams such as activity diagrams or interaction overview diagrams. The settings and commands of software components in the startup configuration can be programmed and represented graphically by a diagram. In particular, programming can be performed easily graphically using graphical elements.

According to one embodiment of the invention, the method comprises testing and validating the actual behavior of the integrated systems at startup of same by a validation module making a comparison with the second startup configuration. The validation module is used to compare the actual behavior and the startup sequence defined in the startup configuration. For example, validation can be performed here by comparing text files.

According to one embodiment of the invention, the method comprises determining a startup sequence from the second startup configuration.

The software components must be started up in a defined order. Dependent components must not be started until their dependencies are available, where the order of availability is determined by user functions. The dependencies between software components, which dependencies are defined in the startup configuration, can be displayed clearly as diagrams by the modeling module using a graphical modeling language such as UML. In this case, the dependencies between software components can be determined, for example, by the connections between the elements in the UML diagram.

According to one embodiment of the invention, the method comprises importing a startup file, which describes the actual behavior of the embedded systems at startup of same.

According to one embodiment of the invention, the method comprises checking whether a difference exists between the first or second startup configuration and the actual behavior of the embedded systems.

The format of the startup file is a textual representation. The actual behavior of the embedded system is written in a startup file, which is imported by the validation module. For the comparison of the first or second startup configuration with the actual behavior of the embedded systems, the comparison function can be provided by comparing text files.

According to one embodiment of the invention, the method comprises readjusting the second startup configuration if a difference exists. Readjustment involves editing the second startup configuration, which may be necessary if a difference exists. A readjustment of the second startup configuration may be a change to the startup sequence contained in the startup configuration. This reduces the difference between the first or second startup configuration and the actual behavior of the embedded systems. In other words, the dependencies between software components of the embedded systems, which dependencies are defined in the startup configuration, are updated.

According to one embodiment of the invention, the startup configuration is readjusted manually in the textual representation. Readjustment can be performed directly in the textual representation of the startup configuration. Depending on requirements or the application, the readjusted startup configuration can be reimported into the modeling module and modeled again, and then the above steps can be repeated.

According to one embodiment of the invention, the second startup configuration is readjusted manually in textual representation.

Alternatively, the second startup configuration can be readjusted in the modeling module. The second startup configuration is hereby readjusted in the graphical representation. The graphical readjustment of the second startup configuration offers a clearer representation of the change to the settings and commands of the software components, which settings and commands are contained in the startup configuration. This simplifies the readjustment of the startup configuration. Depending on requirements or the application, the readjusted startup configuration can be re-exported by a modeling module, and then the above steps are repeated.

The invention also relates to a program element designed to perform the steps described above and below when a processor executes said program element.

The program element may be part of a piece of software stored on a processor of a computer. In this case, the processor can also form the subject matter of the invention. In addition, the term program element is also understood to mean those program elements that use the invention right from the start or those program elements which by an update cause an existing program to use the invention.

The invention also relates to a machine-readable medium on which the program element is stored.

A machine-readable medium may be a floppy disk, a hard disk, a USB (Universal Serial Bus) memory device, a RAM (Random Access Memory), a ROM (Read Only Memory) and an EEPROM (Erasable Programmable Read Only Memory). A machine-readable medium may also be a data communications network such as the Internet, for example, that allows a program-code download.

It should be pointed out that the embodiments of the invention described above and below apply likewise to the device, the method, the computer program, and the machine-readable storage medium.

Of course the individual features can also be combined with one another, some of which combinations may have advantageous effects that go beyond the scope of the sum of the individual effects.

These and other aspects of the present invention are explained and illustrated with reference to the exemplary embodiments described below.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments are described below with reference to the following drawings, in which.

DETAILED DESCRIPTION OF THE PRESENTLY PREFERRED EMBODIMENTS

Figure 1:
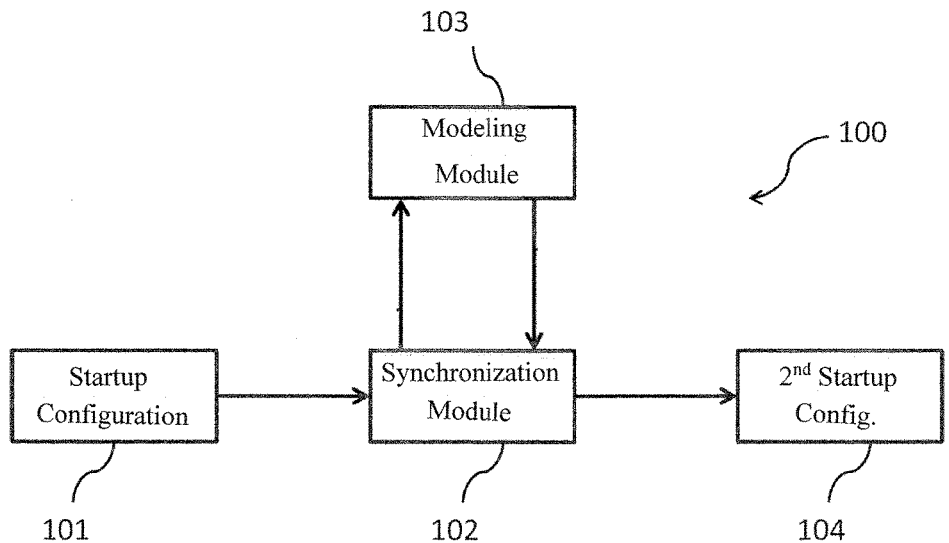
FIG. 1 is a block diagram of a system for synchronizing startup configurations of an embedded system.

FIG. 1 shows a block diagram of a system for synchronizing startup configurations of an embedded system.

The system 100 comprises a system synchronization module 102 and a modeling module 103. The system synchronization module 102 is designed to compare the created startup configuration 101 with the actual startup behavior of the embedded system, and to update the startup configuration 101. In other words, the system synchronization module 102 can import the startup configuration in textual representation and check same with the actual startup behavior written in the startup file, and can then update the startup configuration.

The modeling module 103 is designed for graphical representation and graphical editing of the startup configuration. In other words, the textually represented startup configuration can be imported by the modeling module 103 and graphically represented and processed in the modeling module 103, and then exported in a textual view, as the second startup configuration 104. The startup configuration is represented as a diagram, which is also used independently of computer programs to represent the settings of software components.

Figure 2:
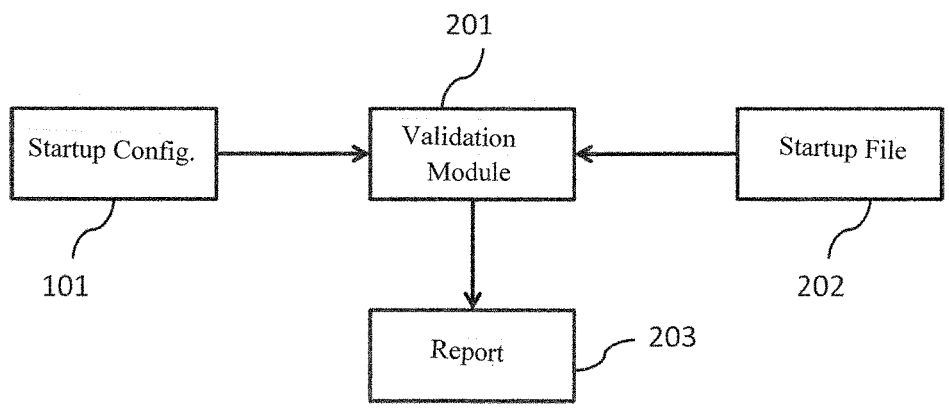
FIG. 2 is a block diagram of a validation module for testing and validating startup configurations of an embedded system.

FIG. 2 shows a block diagram of a validation module designed to check the created startup configuration with the actual startup behavior of the embedded system. The validation module 201 imports the startup configuration 101 in textual representation and compares it with the actual startup behavior of the embedded system written in the startup file 202. In this process, all differences are recorded in a report 203.

Figure 3:
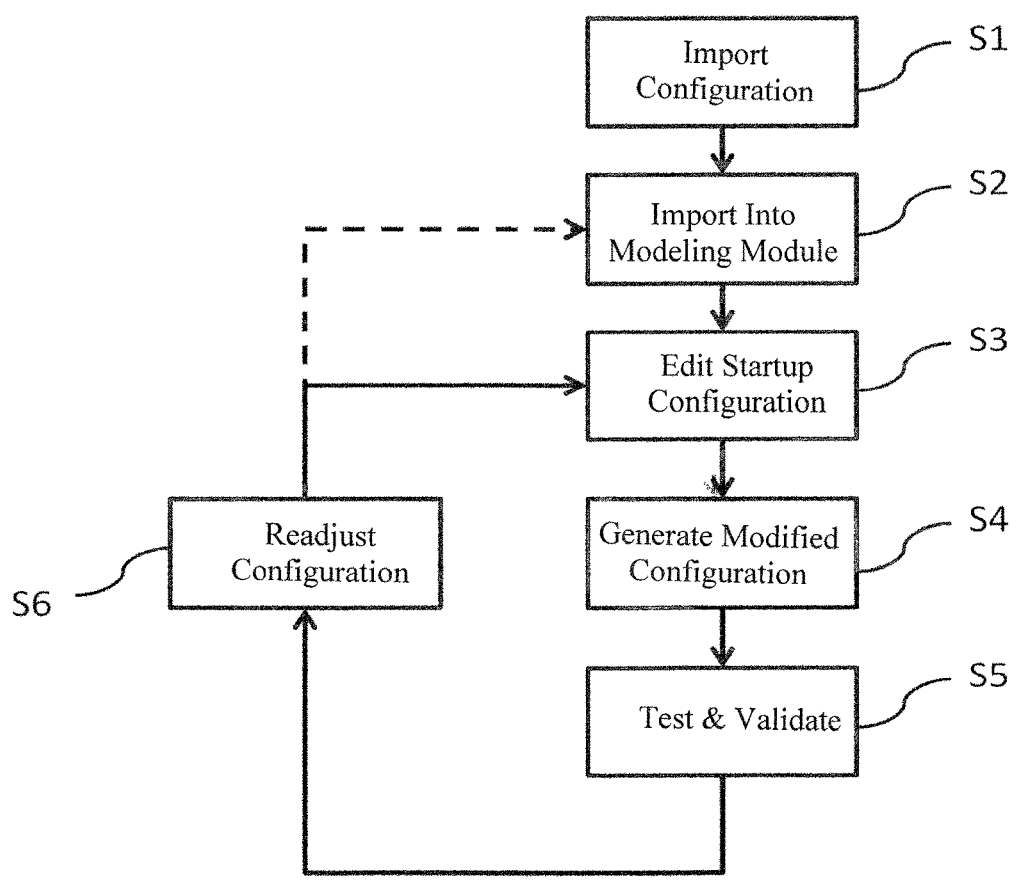
FIG. 3 shows the method for model-based generation of startup configurations.

The method for model-based generation of startup configurations is now described with reference to FIGS. 1, 2 and 3.

In a first step S1, a system synchronization module 102 imports the first startup configuration 101 in textual representation. For an embedded system under LINUX, the formatting of the startup configuration may be an XML file. The startup configuration comprises a plurality of configuration parts of software components, in which are defined the settings of the software components.

In step S2, the imported first startup configuration 101 is imported into a modeling module 103 and represented graphically, i.e. in the form of diagrams, by the modeling module 103. The diagrams may be UML diagrams, which can be generated, for instance, by importing an XML-based startup configuration. The settings or commands of the software components are shown as elements that describe certain functions or components and as connections that describe a connection to the next element.

In step S3, the first startup configuration 101 is edited in the modeling module 103. For example, the dependencies of the software components, which dependencies are defined in the startup configuration, can be changed. This can be done, for instance, by changing the connections between elements in the graphical representation. Should two software components no longer be dependent on one another, the connection between two software components can be removed in the graphical representation.

In step S4, the modeling module 103 generates a second, modified startup configuration 104 in textual representation from the modified graphical representation and exports same into the system synchronization module 102. Thus the settings of the software components, which settings were changed as a diagram, can be generated as a text file.

In step S5, at startup of the embedded system, the modeled startup configuration 104 is tested and validated with the actual behavior of the embedded system. The testing and validation are performed by validation module 201. In this process, a startup sequence is determined from the second startup configuration. The actual behavior of the embedded system is written in a startup file 202 that is imported by the validation module 201. Checking whether a difference exists between the first or second startup configuration and the actual behavior of the embedded system can be performed by comparing text files, i.e. by a comparison between the first or second startup configuration file and the startup file.

The second startup configuration 104 can be readjusted in step S6 if a difference from the actual behavior of the embedded system during startup exists. This can be done by manual readjustment of the startup configuration in the textual representation. For example, a text editor can be used to edit the second startup configuration 104 in the textual representation. In addition, the second startup configuration 104 can be edited by specific programs. Depending on requirements, the method can go back to step S2. In other words, the readjusted startup configuration can be reimported in textual representation into the modeling module and modeled again.

As an alternative, the second startup configuration 104 can be readjusted in the modeling module 103. In other words, the method can go back directly to step S3. In this case, the settings defined in the second startup configuration 104 are represented as a diagram. Thus the second startup configuration 104 can be readjusted clearly by editing the elements and connections in the graphical representation. The changes to the settings defined in the second startup configuration can thereby be both identified and graphically displayed easily and quickly.

In addition, it should be mentioned that the terms "comprising" and "having" do not exclude any other elements, and "a" or "an" does not rule out more than one. It should also be pointed out that features that have been described with reference to one of the above exemplary embodiments or embodiments can also be used in combination with other features of other exemplary embodiments or embodiments described above. Reference signs in the claims shall not be deemed to have a limiting effect.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for model-based generation of startup configurations of embedded systems, comprising:
   importing an embedded system first startup configuration in textual representation into a modeling module by a system synchronization module;
   generating a graphical representation configured as a program flowchart of the first startup configuration by the modeling module;
   modifying the graphical representation of the first startup configuration by editing graphical elements and their respective connections in the modeling module that creates a modified startup configuration by editing the graphical representation of the first startup configuration;
   generating a second, modified startup configuration in textual representation from the modified graphical representation by the modeling module;
   testing and validating an actual behavior of the embedded systems at startup of the embedded system by a validation module making a comparison with the second startup configuration of respective textual representations; and
   exporting the second, modified startup configuration into the system synchronization module.

2. The method as claimed in claim 1, wherein the graphical representation of the first startup configuration comprises at least one diagram.

3. The method as claimed in claim 1, further comprising:
   determining a startup sequence from the second startup configuration;
   importing a startup file, which describes the actual behavior of the embedded systems at startup of the embedded systems; and
   checking whether a difference exists between the first or second startup configuration and the actual behavior of the embedded systems.

4. The method as claimed in claim 3, further comprising:
   readjusting the second startup configuration if a difference exists.

5. The method as claimed in claim 4, wherein the second startup configuration is manually readjusted in the textual representation.

6. The method as claimed in claim 4, wherein the second startup configuration is readjusted in the modeling module.

7. A non-transitory computer machine-readable medium on which a program element is stored which, when executed on a processor of a computer for generating startup configurations, instructs the embedded system to perform the following:
   importing an embedded system first startup configuration in textual representation into a modeling module by a system synchronization module;
   generating a graphical representation configured as a program flowchart of the startup configuration by the modeling module;
   modifying the graphical representation of the startup configuration by editing graphical elements and their respective connections in the modeling module that creates a modified startup configuration by editing the graphical representation of the first startup configuration;
   generating a second, modified startup configuration in textual representation from the modified graphical representation by the modeling module;
   testing and validating an actual behavior of the embedded system at startup of the embedded systems by a validation module making a comparison with the second startup configuration of respective textual representations; and
   exporting the second, modified startup configuration into the system synchronization module.

* * * * *